Figure 12:
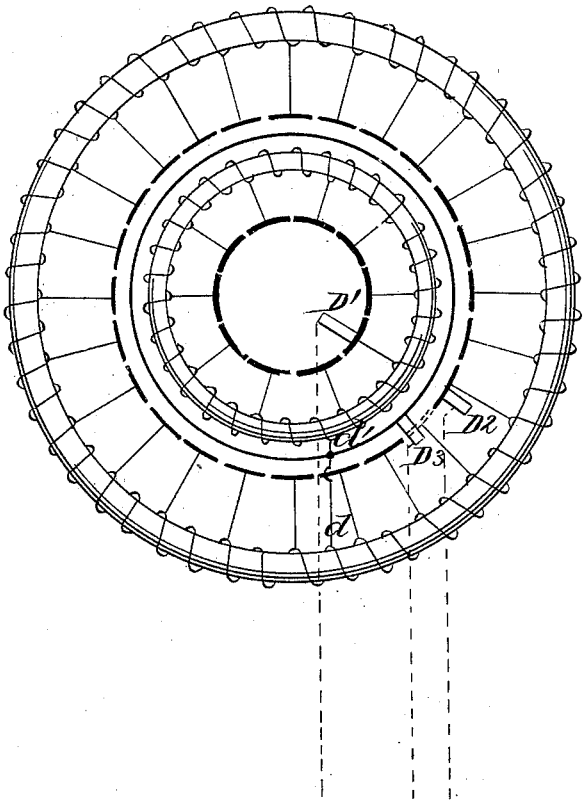

No. 662,752. Patented Nov. 27, 1900.
F. BEDELL.
TRANSMISSION OF ELECTRICAL IMPULSES.
(Application filed July 6, 1899.)
(No Model.) 3 Sheets—Sheet 1.
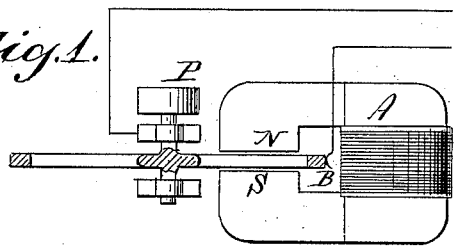
Fig. 1.
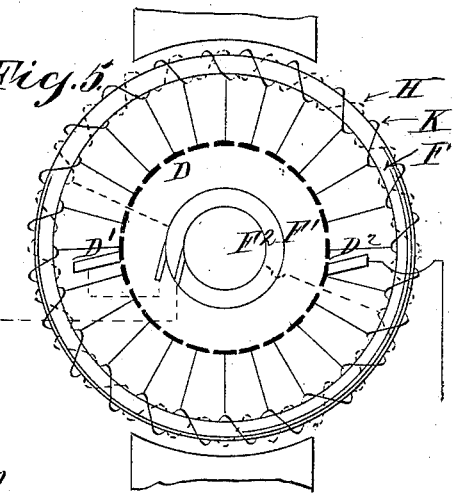
Fig. 5.
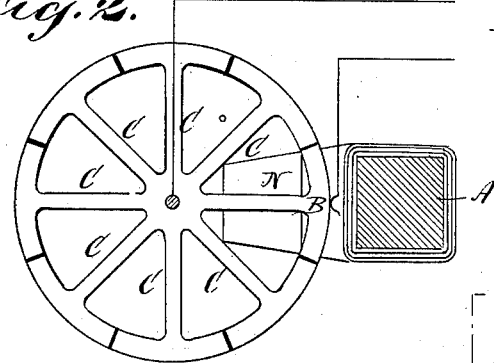
Fig. 2.
Fig. 3.
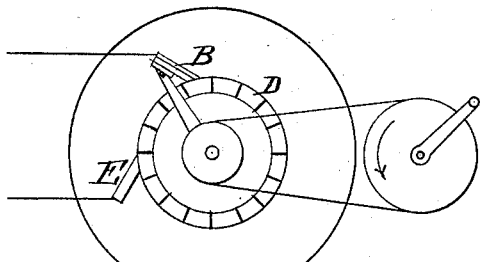
Fig. 4.
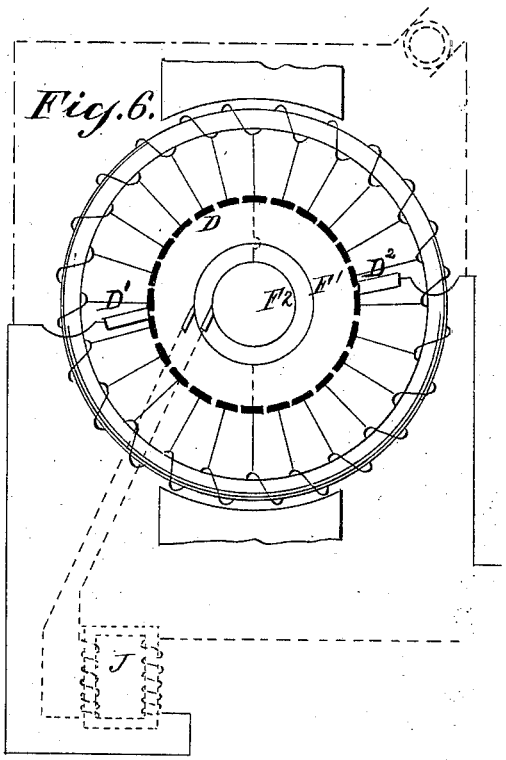
Fig. 6.
Fig. 7.
Witnesses:
O. W. Gardner
L. T. Shaw
Inventor:
Frederick Bedell
by E. M. Bentley
Atty.

No. 662,752. Patented Nov. 27, 1900.
F. BEDELL.
TRANSMISSION OF ELECTRICAL IMPULSES.
(Application filed July 6, 1899.)
(No Model.) 3 Sheets—Sheet 2.
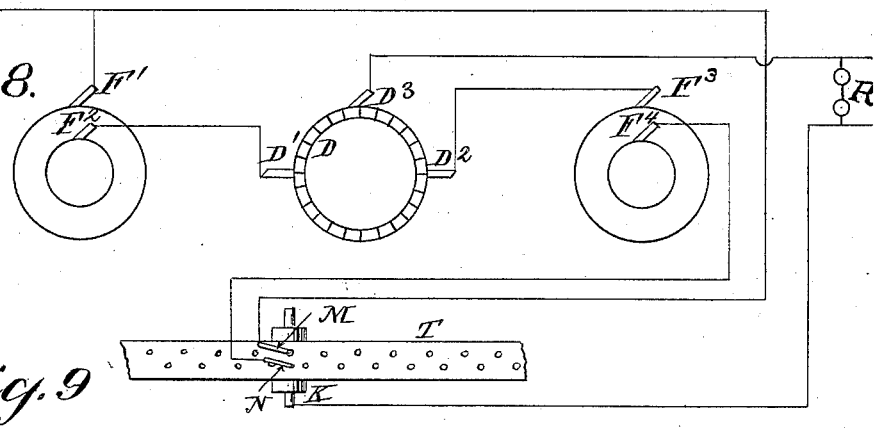
Fig. 8.
Fig. 9
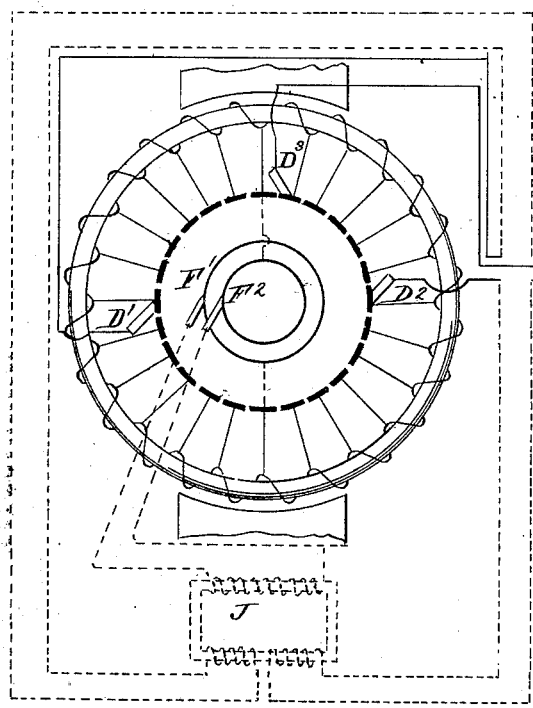
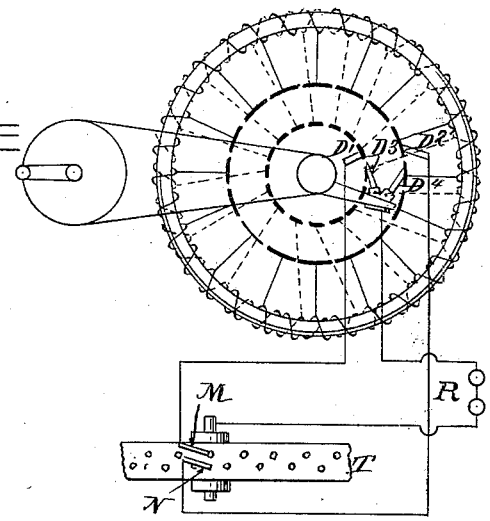
Fig. 11.
Fig. 10.
Witnesses:
O. W. Gardner.
L. L. Shaw
Inventor:
Frederick Bedell
by C. H. Bentley, Atty.
THE NORRIS PETERS CO., PHOTO-LITHO., WASHINGTON, D. C.

No. 662,752. Patented Nov. 27, 1900.
F. BEDELL.
TRANSMISSION OF ELECTRICAL IMPULSES.
(Application filed July 6, 1899.)

(No Model.) 3 Sheets—Sheet 3.

Witnesses: Inventor:
O. W. Gardner. Frederick Bedell
L. L. Shaw by E. M. Bentley
Atty.

THE NORRIS PETERS CO., PHOTO-LITHO., WASHINGTON, D. C.

UNITED STATES PATENT OFFICE.

FREDERICK BEDELL, OF ITHACA, NEW YORK.

TRANSMISSION OF ELECTRICAL IMPULSES.

SPECIFICATION forming part of Letters Patent No. 662,752, dated November 27, 1900.

Application filed July 6, 1899. Serial No. 722,942. (No model.)

*To all whom it may concern:*

Be it known that I, FREDERICK BEDELL, a citizen of the United States, residing at Ithaca, county of Tompkins, State of New York, have invented certain new and useful Improvements in Transmission of Electrical Impulses, of which the following is a specification, reference being made to the accompanying drawings, wherein—

Figure 1 is a plan of an elementary apparatus embodying my invention. Fig. 2 is a vertical section of the apparatus shown in Fig. 1. Fig. 3 is a diagram of the transmitted current impulses. Fig. 4 illustrates, diagrammatically, one form of my invention. Figs. 5 and 6 illustrate, diagrammatically, a modified form of generating apparatus. Fig. 7 is a diagram of both negative and positive impulses. Figs. 8 and 9 illustrate apparatus for the transmission of such negative and positive impulses. Fig. 10 illustrates the method of applying and utilizing such double impulses in a telegraph system, and Figs. 11 and 12 show modified forms of generating apparatus for double currents.

My invention relates to a method of generation and transmission of unidirectional currents, as distinguished from alternating currents, which are derived from a suitable generator of the electrodynamic type in distinction from a battery or chemical generator and are varied in a cyclic order from zero to maximum, so as to take the form of a series of direct-current impulses which may be interrupted at the zero-point in any desired manner for the transmission of intelligence by the combination of the impulses according to a prearranged code.

More particularly my invention relates to the apparatus for generating the described current impulses and transmitting them, with the desired combinations, over the conducting-lines to a receiving-point.

My invention furthermore relates to the method of generating a continuous series of current impulses having minimum line reaction between successive impulses, as distinguished from impulses derived from an alternating current, with maximum reactive effect between impulses.

I have also devised means for transmitting both negative and positive impulses of the described character with selective transmitting devices by which either a positive or negative impulse may be transmitted at any given moment. By this means I am enabled to utilize in the composition of a code not only the differing number of impulses of one direction, but also impulses in a reverse direction, which permits of a briefer and more comprehensive code with a greater variety of code elements.

Referring to Figs. 1, 2, and 3, the character of the currents which I intend to use will be apparent from the elementary apparatus therein shown. These currents are to be always of the same direction and variable periodically from a maximum to a complete zero, and preferably, moreover, to a graduated zero, so that the inductive effects due to line reaction as the current approaches zero and again rises from zero shall be as small as possible. The continuity of impulses employed in my system likewise tends to minimize reactive disturbances and to produce an impulse current peculiarly suited to high-speed signaling. Furthermore, this continuity and the gradual and easy transition from impulse to impulse free from sudden changes in the current strength or in the electromotive force impressed upon the cable are accompanied by distinct advantages in addition to the increase in speed attained thereby, for the deterioration of the cable is minimized by the employment of such impulses. This prolongation of the life of the cable is due to the avoidance of repeated sudden shocks to which a cable is subjected when current impulses are employed, in which the line reaction is not thus minimized between impulses. Indeed, my system may be employed with a voltage even somewhat higher than can be employed with an alternating current or with the customary direct-current source of current and the deterioration of the cable will still be substantially less.

In the drawings, Figs. 1 and 2, a generator is shown of a type sometimes known as a "unipolar" machine, which produces without commutation a current which is always in the same direction. In this machine A is a field-magnet whose opposite poles N and S embrace upon one side of its axis an armature consisting of a series of radial arms or spokes C C, &c., which are electrically united by a common hub at their inner extremities and at their outer extremities are connected, respectively, to the centers of insulated sections of the rim. This armature may be driven by a pulley P, when, according to well-known principles, a current will be generated in the several arms C C in succession, which current will flow longitudinally along the arm and may be taken off from the armature-bearing forming one terminal and from a brush B, bearing upon the periphery of the armature and constituting the other terminal of the circuit. As each arm C enters the magnetic field its corresponding peripheral section comes into contact with the brush B, and it begins to generate an electromotive force which rises to a maximum in a gradual manner and similarly decreases again to zero at the instant when its peripheral section breaks contact with the brush B, the pole-pieces N and S being properly shaped to give this result. The same operation will be repeated by the several arms in succession, so that for each rotation of the armature there will be in the example illustrated eight current impulses having the wave form illustrated in Fig. 3. The currents which would be generated by a machine of the kind just described will be typical of those which I intend to employ in my system, and whatever means of generation may be employed the current therefrom should approximate as closely as possible to those which are characteristic of the generator already described.

It is well known that in unipolar machines there are various expedients for securing a higher electromotive force than would be generated by a single length of conductor passing through the magnetic field, such expedients ordinarily involving the employment of a separate set of brushes for the individual conductors cutting the magnetic field and the connection of such conductors in series through the said brushes. I contemplate the employment of such expedients and of such other expedients familiar to the art in connection with unipolar machines whenever it may be desirable to increase the available electromotive force without affecting the general character of the current impulses.

In Fig. 4 I have shown another method of securing current impulses appropriate for my system. In this figure D is the commutator of an ordinary direct-current generator of the Gramme or Siemens type, whose armature is supposed to be constantly rotated in a constant magnetic field. Upon this commutator bears a stationary brush E, connected to one terminal of the circuit, while the other terminal of the circuit is connected to a rotating brush B. When a bipolar field is used and the usual commutator connections, each rotation of the brush B will give one current impulse which will be at a maximum when the brush B is diametrically opposite the brush A and at zero when it is in coincidence therewith. The rate at which the impulses are generated will be dependent, of course, upon the speed given to the rotating brush B.

In Fig. 5 I have shown another method of producing current impulses of the desired character. In this figure F is a Gramme ring upon which there are wound two equal and distinct circuits H and K, the former being shown in dotted lines and having its diametrically opposite points connected, respectively, to the collector-rings F' and $F^2$ and the latter shown in full lines and connected at intervals to the several bars of commutator D, upon which bear the brushes D' and $D^2$. Thus an alternating current will be produced in one winding and a direct current in the other and the two will be connected in series. Since both windings have the same number of turns and rotate in the same magnetic field, they will generate the same electromotive force and in combination, they will give a series of unidirectional impulses, one for each rotation, which at the maximum point will have twice the electromotive force of the respective windings and will then fall completely to zero, since the two electromotive forces of the respective windings will when opposed cancel each other and will unite when coöperating. Thus by combining equal alternating and direct electromotive forces we have as a result a pulsating direct electromotive force which falls completely to zero. Fig. 6 shows an arrangement for reaching the same result with a single winding, which is connected as before to a commutator D and also has its diametrically opposite points connected to collector-rings F' and $F^2$. The rotation of the armature will thus generate both an alternating and a direct electromotive force, the former appearing at the collector-rings F' $F^2$ and the latter at the commutator-brushes D' $D^2$. The alternating current is led to the primary coil of a transformer J, whose secondary is in series with the direct current passing from the brushes to the line. In this manner also may the alternating electromotive force be imposed upon the direct to convert the latter into a pulsating electromotive force touching the zero-line between the succeeding impulses. I desire in some cases to produce two such unidirectional pulsating currents which are distinct from each other, one positive and the other negative, but both having common zero-points, the two currents having the wave form shown in Fig. 7. Both currents can then by means of the transmitter be interrupted at once by breaking the circuit when both are at zero, and at any subsequent period either a positive or a negative impulse may be selected for transmission. This will increase greatly the code capacity of the system, since for each impulse I have the choice of either a positive or a negative current, which is not possible with an alternating current, nor of course with a single current only. Furthermore, on account of the graduated zero the current is interrupted at the period of minimum inductive effect, and consequently impulses may be transmitted over land lines or cables at a much higher speed than can be attained with an alternating current interrupted at the zero-points, at which times the current is changing most rapidly and the disturbing inductive effects are the greatest.

A result somewhat similar to the one which I attained has heretofore been attained by employing two alternating electromotive forces of opposite polarity, one being positive when the other is negative, and vice versa. In such a case the generated electromotive force being always alternating it is necessary in order to impress on the line only positive or only negative impulses to alternately connect first one and then the other source of alternating electromotive force to the line by a circuit-changing device operating between succeeding semicycles, which must produce either a momentary open or short circuit with the disturbing inductive effect incident thereto. In my arrangement, however, the circuit remains closed except as it be opened or controlled by the transmitting device, and it becomes possible to send a succession of impulses without opening the circuit or short-circuiting the line in the manner necessitated by the prior arrangement just mentioned. Fig. 8 shows a method of generating and applying such double direct currents. In this figure D is the commutator of a direct-current machine, and besides the two brushes D' and D² there is a third intermediate brush D³ half-way between the other two. This third brush, which may be termed the "zero-brush," is connected to the transmitting-line, and the other two brushes D' and D² are connected, respectively, to one of the collector-rings of two alternators for modifying the uniform direct current into a pulsating direct current. The two rings of one alternator are indicated at F' and F² (the latter being connected to brush D') and those of the other at F³ and F⁴, (the former being connected to brush D².) The rings F' and F⁴ are connected, respectively, to the brushes M and N of the transmitter which bear on the perforated tape T, which has two rows of perforations, one under each brush, that allow the brushes to make contact with cylinder K, leading to the opposite line-wire of the transmitting system whenever a perforation comes opposite a brush. By suitably perforating the tape and adjusting its speed with reference to the frequency of the impulses either a positive or a negative impulse complete from zero to zero may be transmitted, or both may be suppressed for any desired period by having the unperforated part of the paper pass under the brushes M N at the instant of zero current. The positive impulses may, for example, correspond to the dashes and the negative impulses to the dots of the Morse code, and, as appears in Fig. 10, the word "code" would be transmitted by a series of impulses having the sequence indicated in the figure. Any other desired combinations may be made on the same principle. The receiving apparatus R may be of any well-known description or of any form adapted to respond to the transmitted impulses.

In Fig. 9 another method of generating the two sets of impulses from a single winding is shown, being somewhat analogous to the arrangement of Fig. 6 in combination with that of Fig. 8. Here the rings F' F² lead, as before, to the primary circuit of transformer J; but there are two secondary coils, each in series with one of the brushes D' D² and the corresponding line-wire. Thus, just as in Fig. 8, there is a positive and a negative unidirectional electromotive force, both modified synchronously by an alternating electromotive force and converted into the described pulsating electromotive force.

Still another method of securing the double unidirectional current with coincident maximum and zero points is indicated in Fig. 11, which shows an armature having two similar windings independent of each other and each provided with a commutator upon which the brushes D' and D² bear in the usual manner, while two connected rotating brushes D³ and D⁴ bear, respectively, upon the same two commutators, this arrangement being in some respects a duplication of the arrangement appearing in Fig. 4. The brushes D' and D² lead, respectively, to the brushes M and N of the transmitter shown in Fig. 8, while the two brushes D³ and D⁴ correspond to the intermediate or zero brush D³ of Fig. 8, and are in like manner connected to the line. When the rotating brushes D³ and D⁴ are coincident in position with the stationary brushes D' and D², both currents will be at zero, and at 180° will be at a maximum, so that there will be a simultaneous transmission of the double pulsating unidirectional currents in the manner already described.

Still another arrangement is shown in Fig. 12, wherein, as in Fig. 11, there are two armature-windings, each with a single stationary brush, D' and D², while the zero-brush D³ bears upon a collector-ring connected to each of the armature-windings at a suitable point therein, being connected to the outer winding at the point $d$ and to the inner winding at the point $d'$. The action of this form of machine will be similar to that shown in Fig. 11, while the use of the rotating brush is avoided by the presence of the collector-ring.

It will be understood that in the several arrangements of generators above described I may, in the well-known manner, use multipolar instead of bipolar machines, while in other respects I do not limit myself to the precise apparatus shown, but may adopt other modifications embodying the same general principles without departing from the spirit of my invention. I may, for example, use a rotary converter as the source of current. Thus in Fig. 6 the chain-dotted lines show wires leading from any source of direct current, as an electric-lighting system, and connecting with brushes D' and D². This will serve to drive the machine as a rotary converter, which will produce the telegraphic currents already described.

What I claim as new, and desire to secure by Letters Patent, is—

1. The method of transmitting intelligence which consists in generating dynamically a series of unidirectional impulses of electromotive force, transmitting over a circuit code-determined current impulses each complete from zero to zero and receiving the transmitted impulses by means of suitable receiving apparatus.

2. The method of transmitting intelligence which consists in generating dynamically a series of unidirectional impulses of electromotive force which impulses fall gradually to zero, and transmitting certain current impulses in accordance with a prearranged code by interrupting the circuit at moments of zero current.

3. The method of transmitting intelligence which consists in generating two unidirectional electromotive forces of opposite direction which periodically and simultaneously vary from zero to a maximum, and transmitting certain complete current impulses by means of a selective device which interrupts the circuit at instants of zero current and determines the transmission of either a positive or negative impulse.

4. The method of transmitting electric currents which consists in generating two series of unidirectional impulses of electromotive force, one positive and the other negative, and both having coincident zero and maximum points, and transmitting between successive zero-points either a positive or a negative current impulse as desired.

5. The method of transmitting intelligence which consists in generating dynamically one or more series of unidirectional impulses of electromotive force which impulses fall gradually to zero and rise gradually therefrom, and transmitting code-determined current impulses over a transmitting-line to apparatus adapted to receive the transmitted impulses.

6. The method of transmitting electric currents in unidirectional impulses which consists in applying to the line a direct electromotive force of constant value, modifying the effect of the same by means of an alternating electromotive force having a maximum value equal to the constant value of the direct electromotive force, and transmitting certain complete current impulses by means of a suitable selective device.

7. The method of transmitting electric currents which consists in deriving from the same generating apparatus direct and alternating electromotive forces, applying the direct electromotive force to a line-circuit and modifying its effect by means of the alternating electromotive force so as to produce a continuous series of unidirectional current impulses, and transmitting certain complete current impulses by means of a suitable selective device.

8. The method of telegraphing which consists in deriving a direct electromotive force from the commutator of a dynamic generating apparatus and deriving an alternating electromotive force from the secondary of a transformer whose primary is connected to alternating collecting-rings on said apparatus, superposing said direct and alternating electromotive forces so as to produce a continuous series of unidirectional current impulses, and transmitting code-determined current impulses over a line-circuit to suitable receiving apparatus.

9. The method of telegraphing which consists in applying to the line a direct electromotive force of constant value, modifying the effect of the same by means of an alternating electromotive force having graduated maximum points and a maximum value equal to the constant value of the direct electromotive force whereby the resulting current will consist of a series of unidirectional impulses having graduated zero-points, and transmitting code-determined impulses over a line-circuit to suitable receiving apparatus.

10. The method of transmitting electric currents which consists in applying to the line a direct electromotive force of constant value, and modifying the effect of the said electromotive force on each side of an intermediate or neutral point by means of an alternating electromotive force having a maximum value equal to one-half of the constant value of the direct electromotive force, whereby between the said neutral point and each branch of the line there is a series of unidirectional impulses of electromotive force, those on the one side being opposite in direction to those on the other side, but both having coincident maximum and zero points, and transmitting over the line either a positive or a negative current impulse at will.

11. The method of telegraphing which consists in transmitting over a circuit a series of dynamically-generated current impulses rising and falling in value with minimum line reaction between said impulses, and interrupting the circuit at said moments of minimum line reaction according to a predetermined code.

12. The method of telegraphing which consists in generating dynamically a continuous uninterrupted series of unidirectional impulses of electromotive force and transmitting to suitable receiving apparatus code-determined current impulses corresponding respectively to said impulses of electromotive force.

13. The method of telegraphing which consists in generating dynamically one or more continuous series of unidirectional impulses of electromotive force having a gradually rising and falling value, and transmitting over a circuit code-determined current impulses each complete from zero to zero without interrupting or short-circuiting the line or generator circuit except according to the requirements of the code.

14. The method of telegraphing which consists in transmitting over a circuit a series of direct-current impulses, each impulse being derived from the same source of dynamically-generated electromotive force as the preceding impulse and having a gradually rising and falling value, and interrupting the circuit at moments of zero current according to a predetermined code.

15. The method of telegraphing which consists in generating dynamically two series of impulses of electromotive force gradually rising and falling in value, all the impulses of each series being of the same polarity and derived from the same generating-coils, and transmitting certain current impulses, according to a predetermined code, to a suitable receiver at a distant point.

16. The method of telegraphing which consists in generating dynamically a series of current impulses, transmitting said impulses over a circuit and interrupting the circuit between said impulses according to a predetermined code, at moments when the current is changing at a minimum rate.

17. The method of telegraphing which consists in generating dynamically a series of current impulses of one polarity, rising and falling in value with a minimum rate of change when at or near the zero-points, transmitting said impulses over a circuit, and interrupting the circuit at moments of zero current according to a prearranged code.

18. The method of transmitting intelligence which consists in applying to a circuit a direct electromotive force of constant value, modifying the effect of the same by means of an alternating electromotive force having a maximum value equal to the constant value of the direct electromotive force, whereby a series of unidirectional impulses of electromotive force is impressed upon the circuit, and interrupting said circuit at moments of zero current, said moments being coincident with natural maximum points of the alternating electromotive force.

19. The method of transmitting intelligence which consists in applying to a circuit a direct electromotive force, modifying the effect of the same by means of an alternating electromotive force, whereby a series of impulses of electromotive force is impressed on the circuit, and interrupting the circuit between successive impulses at natural maximum points of the alternating electromotive force.

20. The method of transmitting intelligence which consists in applying to a circuit a direct electromotive force, modifying the effect of the same by means of an alternating electromotive force having graduated maximum points whereby the resulting current will consist of a series of impulses having graduated maximum and minimum points, and interrupting the circuit at said minimum points in accordance with a predetermined code.

In witness whereof I have hereunto set my hand, before two subscribing witnesses, this 5th day of July, 1899.

FREDERICK BEDELL.

Witnesses:
  L. T. SHAW,
  G. W. HOPKINS.